(12) United States Patent
Liao

(10) Patent No.: US 7,317,585 B2
(45) Date of Patent: Jan. 8, 2008

(54) COMPACT IMAGING LENS SYSTEM

(75) Inventor: Chen-cheng Liao, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/412,448

(22) Filed: Apr. 27, 2006

(65) Prior Publication Data
US 2006/0250706 A1 Nov. 9, 2006

(30) Foreign Application Priority Data
May 6, 2005 (TW) .............................. 94114757 A

(51) Int. Cl.
*G02B 9/04* (2006.01)
(52) U.S. Cl. ...................................... 359/793; 359/795
(58) Field of Classification Search ................ 359/691, 359/692, 793, 794, 795
See application file for complete search history.

(56) References Cited

U.S. PATENT DOCUMENTS

| 6,031,670 | A |  | 2/2000 | Inoue |  |
|---|---|---|---|---|---|
| 6,067,196 | A | * | 5/2000 | Yamamoto et al. | 359/565 |
| 6,441,971 | B2 |  | 8/2002 | Ning |  |
| 2006/0072200 | A1 | * | 4/2006 | Yamada | 359/557 |

\* cited by examiner

*Primary Examiner*—Timothy Thompson

(57) ABSTRACT

A compact imaging lens system consists of a first positive aspheric lens element (1) on the object side and a second negative aspheric lens element (2) on the image side. The first lens element is a meniscus lens convex toward the image side, whereby the incident light beam can be diverged by the first concave surface (11) of the first lens element, and thus a wide area of the second convex surface (12) of the first lens element can be illuminated by the divergent light beam. The second negative aspheric lens element is provided mainly for correcting chromatic aberration and off-axis aberration.

12 Claims, 7 Drawing Sheets

COMPACT IMAGING LENS SYSTEM

BACKGROUND OF THE INVENTION

1. Field of the Invention

The present invention relates to a lens system, and particularly relates to a low-cost, small-size and yet high-performance imaging lens system suitable for use in a camera phone and a compact digital camera.

2. Description of Prior Art

Portable imaging devices, such as camera phones, compact digital cameras and personal digital assistances (PDAs), generally require its lens system to be compact and low cost while maintaining a high level of optical performance. Due to the limitation of available space, imaging lenses for the portable imaging devices have dimensions much smaller than those for common imaging cameras and video cameras. Accordingly, camera phones and compact digital cameras generally employ fixed focal length lenses.

As an image pick-up device, conventional spherical glass lenses have been widely adopted in optical industry field because there is a wide range of materials available for making such lenses and the color aberration thereof can be easily corrected. However, the spherical glass lenses have the disadvantages of being difficulty in correcting spherical aberration and astigmatic aberration when they are used in cases having a smaller F-number and a larger wide angle of field. To improve the above-mentioned drawbacks existing in the conventional spherical glass lenses, aspheric plastic lenses or aspheric molded glass lenses have been used to obtain better image quality.

In the current market, most imaging lens systems for compact imaging devices, such as camera phones, are generally composed of two plastic lens elements, or of one glass lens element and two plastic lens elements. U.S. Pat. No. 6,031,670, entitled "Wide-angle Lens", discloses an imaging lens system composed of two plastic lens elements, one of which is a negative meniscus lens element on the object side and the other is a positive biconvex lens element on the image side. Both of the two plastic lens elements are formed as aspheric lenses for aberration correction. However, the overall length of such a lens system is still very long, thus preventing the lens system from having an even smaller volume to meet the light and compact design requirements for all electronic products. Such a conventional imaging lens system therefore has limited applications.

U.S. Pat. No. 6,441,971, entitled "Compact Lens with External Aperture Stop", discloses an imaging lens system composed of one glass lens element and two plastic lens elements. The imaging lens system of the '971 patent, which is suitable for use in compact portable electronic devices, includes, from the object side thereof, an aperture stop, a distal meniscus lens element made of glass, and first and second aspheric lens elements made of plastics. The meniscus lens element has a convex surface facing the object side, and is adapted to reduce lens temperature sensitivity and provide most of the focusing power while the first and second aspheric lens elements mainly provide aberration compensation. However, in this configuration, the sensitivity to the surface eccentricity of the lens surfaces is relatively high. Accordingly, manufacturing allowance must be strictly controlled, thereby adversely affecting mass productivity. Further, the configuration of one glass lens element and two plastic lens elements is still not competitive in cost. Also, the overall length and weight of this imaging lens system become longer and heavier as compared to an imaging lens system having only two lens elements. Accordingly, in order to obtain the small size and portability desired by the market, further improvements on such an imaging lens system are needed.

SUMMARY OF THE INVENTION

Accordingly, an object of the present invention is to provide a compact imaging lens system that has only two component lens elements particularly suitable for use in a portable imaging device.

Another object of the present invention is to provide a compact imaging lens system that can be easily manufactured at low costs while offering a high level of optical performance.

To achieve the above objects, a compact imaging lens system in accordance with the present invention comprises a first positive lens element on the object side and a second negative lens element on the image side. The first positive lens element has a first concave surface facing the object side and a second convex surface on the image side. Both the first and second lens elements are aspheric lenses each having at least one aspheric surface.

The compact imaging lens system of the present invention satisfies the following conditional expression:

$$0.6 < -\frac{f_1}{f_2} < 1.2 \quad \text{(a-1)}$$

where $f_1$ and $f_2$ represent the focal lengths of the first and second lens elements, respectively.

In a preferred embodiment of the present invention, the first and second surfaces of the first lens element are both aspheric surfaces and satisfy the following conditional expression:

$$0.1 < \frac{S_1}{S_2} \cdot F_{NO} < 0.3 \quad \text{(a-2)}$$

where $S_1$ represents the sagitta of the first surface of the first lens element at the maximum diameter thereof, $S_2$ represents the sagitta of the second surface of the first lens element at the maximum diameter thereof, and $F_{NO}$ represents the relative aperture diameter.

The second surface of the first lens element and a first surface of the second lens element on the object side satisfy the following conditional expression:

$$0.45 < \frac{R_2}{R_3} < 0.95 \quad \text{(a-3)}$$

where $R_2$ and $R_3$ represent the curvature radii of the second surface of the first lens element and the first surface of the second lens element, respectively.

According to the present invention, an aperture is positioned between the object to be imaged and the first surface of the first lens element.

The aspheric surfaces of the first and second lens elements are expressed by the following equation:

$$z = \frac{ch^2}{1 + [1-(k+1)c^2h^2]^{\frac{1}{2}}} + Ah^4 + Bh^6 + Ch^8 + Dh^{10} + Eh^{12} + Fh^{14} + Gh^{16}$$

The present compact imaging lens system adopts a positive and a negative aspheric lens elements. The first lens element is a meniscus lens convex toward the image side, whereby the incident light beam is diverged by the first surface of the first lens element, and thus a wide area of the second surface of the first lens element can be illuminated by the divergent light beam. Consequently, aberrations can be more effectively corrected by the aspheric surfaces and tolerance sensitivity can be reduced. The second lens element is a negative lens, and is provided mainly for correcting chromatic aberration and off-axis aberration. Besides aberration compensation, the aspheric design of both first and second lens elements also ensures significant reduction in overall length of the optical system. Further, the present imaging lens system consists of only two component lenses that are made of plastic. This facilitates cost reduction, tolerance sensitivity reduction, easy assembly, and thus mass production.

BRIEF DESCRIPTION OF THE DRAWINGS

The present invention may best be understood through the following description with reference to the accompanying drawings, in which.

DETAILED DESCRIPTION OF THE INVENTION

Figure 1:
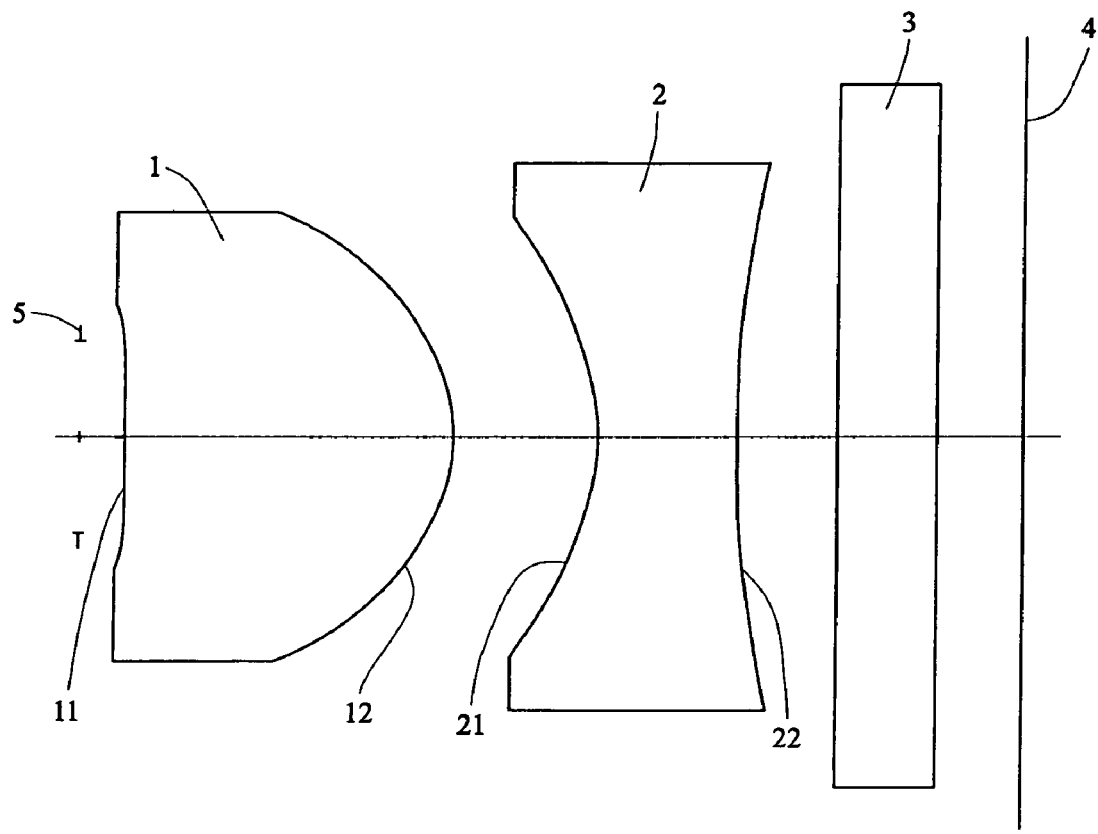
FIG. 1 is an optical cross-sectional view of a compact imaging lens system in accordance with the concept of the present invention.

Referring to FIG. 1, a compact imaging lens system in accordance with the present invention comprises a first positive lens element 1 on the object side, and a second negative lens element 2 on the image side. The incident light from the object to be imaged is transmitted through the first and second lens elements 1, 2, and is focused onto an image pickup device (image plane) 4, such as a CCD (Charge-Coupled Device) sensor or CMOS (Complimentary Metal-Oxide Semiconductor) sensor, to obtain a clear image. A cover glass 3 is shown between the second lens element 2 and the image plane 4, and an aperture 5 is disposed in front of the first lens element 1. The cover glass 3 serves to protect the image pickup surface of the image pickup device 4. For convenience of illustration, the cover glass 3 is shown as being positioned to the left side of the image plane 4. However, it is actually positioned with a surface in contact with the image pickup surface of the image pickup device that is positioned at the image plane 4. The aperture 5 is positioned at the most front of the present optical system, whereby the exit pupil position of the present optical system is caused to be far away from the image plane 4.

The first positive lens element 1 is in the form of a meniscus lens having a first concave surface 11 facing the object side and an opposite second convex surface 12 on the image side. At least one of the surfaces 11, 12 are made aspheric. The second negative lens element 2 has a first concave surface 21 on the object side and an opposite second concave surface 22 on the image side. At least one of the surfaces 21, 22 are made aspheric.

The first and second lens elements 1, 2 of the present compact imaging lens system satisfy the following conditional expression:

$$0.6 < -\frac{f_1}{f_2} < 1.2 \quad \text{(a-1)}$$

where $f_1$ and $f_2$ represent the focal lengths of the first and second lens elements 1, 2, respectively. When the ratio of $f_1$ to $f_2$ is at or beyond the upper limit, defocus becomes more conspicuous. When the ratio is at or below the lower limit, the Petzval radius becomes smaller and it becomes more difficult to correct off-axis aberrations.

It is understandable that, in the present invention, both the first and second surfaces 11, 12 of the first lens element 1 can be made aspheric. Since the first surface 11 of the first lens element 1 is a concave surface, the incident light beam from the object to be imaged is diverged by the first surface 11, and thus a wide area of the second convex surface 12 of the first lens element 1 can be illuminated by the divergent light beam. Consequently, aberrations can be more effectively corrected and tolerance sensitivity can be reduced, which attributes to the two aspheric surfaces 11, 12 and the meniscus shape of the first lens element 1.

When both the first and second surfaces 11, 12 of the first lens element 1 are made aspheric, they satisfy the following condition:

$$0.1 < \frac{S_1}{S_2} \cdot F_{NO} < 0.3 \quad \text{(a-2)}$$

where $S_1$ represents the sagitta of the first surface 11 of the first lens element 1 at the maximum diameter thereof, $S_2$ represents the sagitta of the second surface 12 of the first lens element 1 at the maximum diameter thereof, and $F_{NO}$ represents the relative aperture diameter. When the value is at or beyond the upper limit, the off-axis upper light beam is difficult to be corrected and smear occurs. When the value is at or below the lower limit, the aperture aberration becomes large in the case of a 2.8 or 3.2 relative aperture diameter $F_{NO}$ that is commonly seen in most mobile phones for sufficient light. When the relative aperture diameter $F_{NO}$ is beyond 4, the aperture aberration is not evident.

In a preferred embodiment of the present invention, both the first and second surfaces 21, 22 of the second lens element 2 can be made aspheric for optimum aberration correction. The second surface 12 of the first lens element 1 and the first surface 21 of the second lens element 2 on the object side satisfy the following conditional expression:

$$0.45 < \frac{R_2}{R_3} < 0.95 \quad \text{(a-3)}$$

where $R_2$ and $R_3$ represent the curvature radii of the second surface 12 of the first lens element 1 and the first surface 21 of the second lens element 2, respectively. When the value is at or beyond the upper limit, strong field curvature, concave toward the incoming light beam, occurs. When the value is at or below the lower limit, astigmatism is difficult to be corrected.

When the first and second lens elements 1, 2 are both spherical lenses, cemented lens elements are further needed to correct various aberrations, which increases the overall length of the lens system. Accordingly, the present invention employs aspheric lens elements to reduce the lens element number and thus the lens length. The aspheric surfaces of the first and second lens elements 1, 2 are expressed by the following equation:

$$z = \frac{ch^2}{1 + [1 - (k+1)c^2h^2]^{\frac{1}{2}}} + Ah^4 + Bh^6 + Ch^8 + Dh^{10} + Eh^{12} + Fh^{14} + Gh^{16}$$

where z is Sag value along the optical axis, c is the base curvature (1/radius) of the surface, h is the semi-diameter height, k is the conic coefficient, and A, B, C, D, E, F and G are the 4th-order, 6th-order, 8th-order, 10th-order, 12th-order, 14th-order and 16th-order aspheric coefficients, respectively.

The present invention will be more fully understood by describing three numerical embodiments as follows.

The numerical data of Numerical Embodiments 1, 2 and 3 will be shown below. In each numerical embodiment, i (i=1-5) indicates the order of the surface from the object side (including aperture 5 and lens surfaces), Ri indicates the curvature radius of the ith surface, D indicates the ith member thickness or the distance between the ith surface and the (i+1)th surface, and Nd and Vd indicate the refractive index and Abbe number of the ith member, respectively, for d-line.

| | Numerical Embodiment 1 | | | | |
|---|---|---|---|---|---|
| Surface (i) | Ri (mm) | D (mm) | Nd | Vd | Conic |
| 1 (Aperture) | Infinite | 0.15 | | | |
| 2 | −15.0338 | 1.1 | 1.5247 | 56.2 | 161.5635 |
| 3 | −0.6479 | 0.48 | | | −2.5 |
| 4 | −0.9617 | 0.52 | 1.5856 | 29.9 | −1.883 |
| 5 | 239.81 | | | | −4941.5 |

Aspheric coefficients for the aspheric surfaces are illustrated below:

| | Coef. | | | | | | |
|---|---|---|---|---|---|---|---|
| Surface (i) | A | B | C | D | E | F | G |
| 2 | −0.409367 | 1.3918 | 15.1137 | 24.424732 | 0 | 0 | 0 |
| 3 | −0.461098 | 0.399467 | −1.620468 | 2.759599 | −0.233556 | −6.316874 | 5.534385 |
| 4 | 0.911740 | −2.196011 | 1.596119 | 3.804581 | −10.483998 | 10.214548 | −3.629267 |
| 5 | 0.470218 | −0.778066 | 0.365437 | 0.714804 | −1.162860 | 0.569367 | −0.043603 |

In this numerical embodiment, the respective values of the above conditions (a-1), (a-2) and (a-3), the relative aperture diameter $F_{NO}$, and the focal length are listed in the table as below.

| | |
|---|---|
| $-f_1/f_2$ | 0.769 |
| $S_1 * F_{NO}/S_2$ | 0.215 |
| $R_2/R_3$ | 0.674 |
| $F_{NO}$ | 2.84 |
| Focal Length | 2.48 mm |

Figure 2:
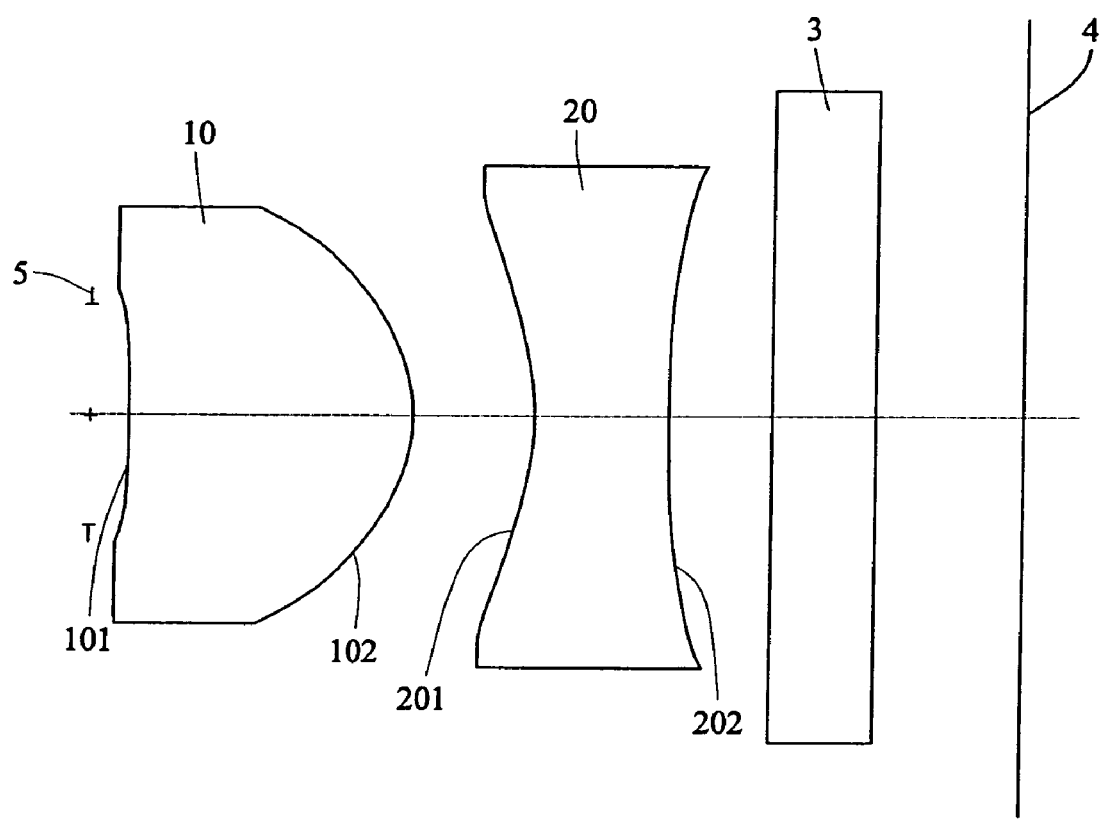
FIG. 2 is an optical cross-sectional view of a compact imaging lens system in accordance with Numerical Embodiment 1 of the present invention.
Figure 3A:
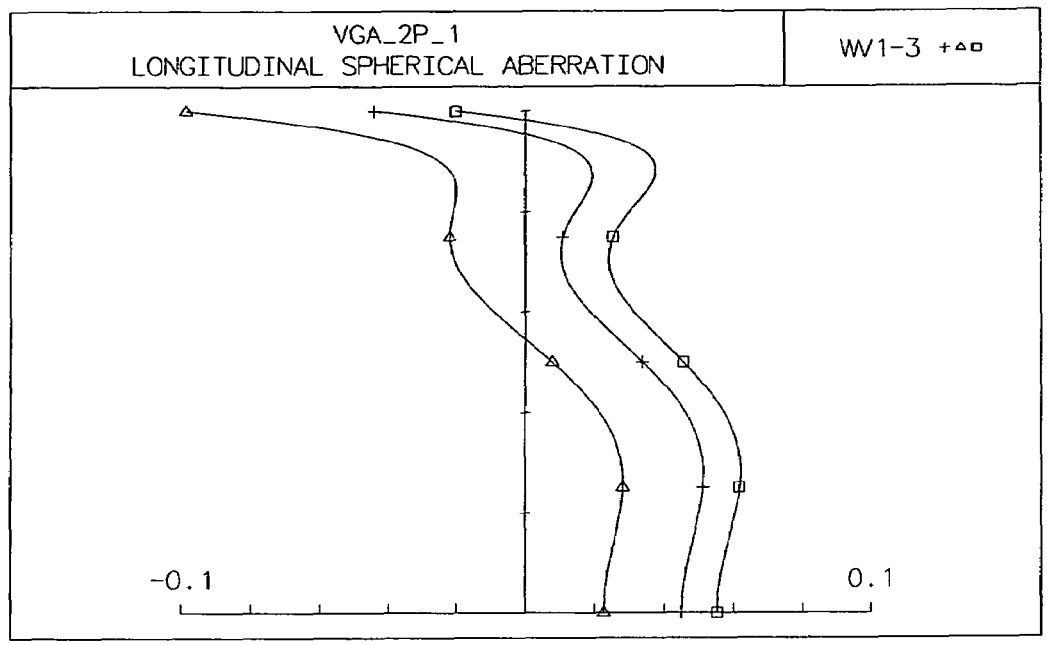
FIG. 3A shows a graph of longitudinal spherical aberration of Numerical Embodiment 1 of the present invention.
Figure 3B:
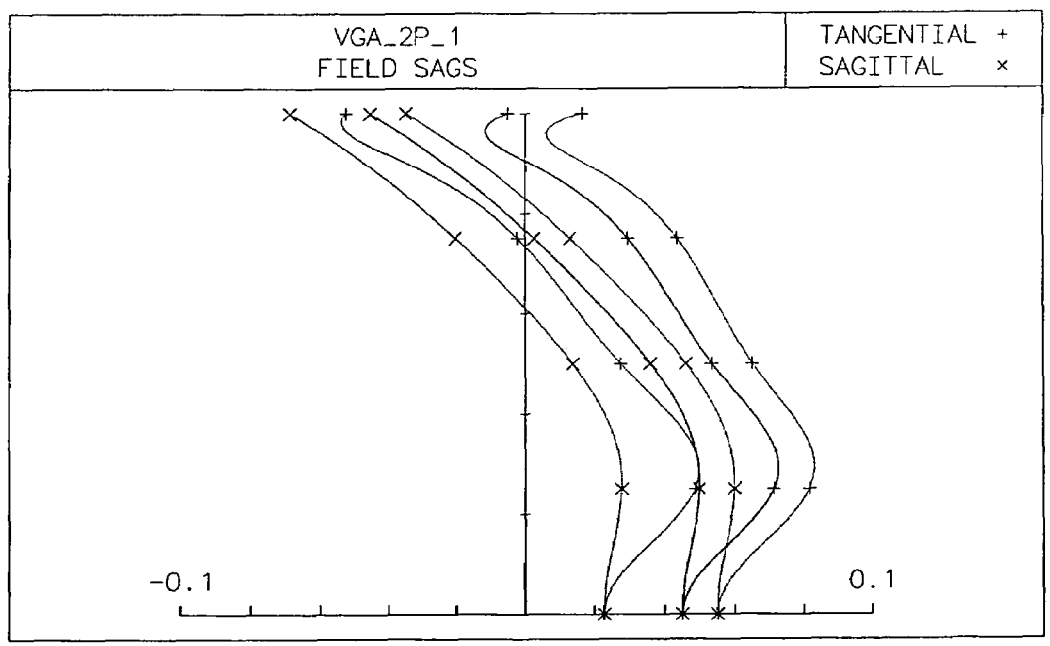
FIG. 3B shows a graph of field curvature of Numerical Embodiment 1 of the present invention.

FIG. 2 shows an optical cross-sectional view of a compact imaging lens system in accordance with Numerical Embodiment 1 of the present invention. Both first and second surfaces 101, 102 of the first lens element 10 in Numerical Embodiment 1 are aspheric. Also, both first and second surfaces 201, 202 of the second lens element 20 are made aspheric. The focal length of the compact imaging lens system of Numerical Embodiment 1 is 2.48 mm, and the relative aperture diameter is 2.84. The values of the above conditions (a-1), (a-2) and (a-3) are 0.769, 0.215 and 0.674, respectively. FIG. 3A shows a graph of longitudinal spherical abberation of Numerical Embodiment 1. FIG. 3B shows a graph of field curvature of Numerical Embodiment 1. From these graphs, it can be seen that the present compact imaging lens system of Numerical Embodiment 1 provides a high level of optical performance.

Numerical Embodiment 2

| Surface (i) | Ri (mm) | D (mm) | Nd | Vd | Conic |
|---|---|---|---|---|---|
| 1 (Aperture) | Infinite | 0.15 | | | |
| 2 | −8.835 | 1.2 | 1.5247 | 56.2 | 83.35 |
| 3 | −0.62 | 0.45 | | | −1.6784 |
| 4 | −0.944 | 0.52 | 1.5856 | 29.9 | −2.09284 |
| 5 | 72.84 | | | | −4565.4 |

Aspheric coefficients for the aspheric surfaces are illustrated below:

| | Coef. | | | | | | |
|---|---|---|---|---|---|---|---|
| Surface (i) | A | B | C | D | E | F | G |
| 2 | −0.459423 | 1.999468 | −14.854950 | 24.936916 | 0 | 0 | 0 |
| 3 | −0.041542 | −0.144894 | −1.119951 | 2.2419 | 0.443446 | −5.481420 | 4.063554 |
| 4 | 1.137760 | −2.428201 | 1.452271 | 4.534587 | −11.119066 | 9.820746 | −3.141489 |
| 5 | 0.567439 | −0.893911 | 0.376458 | 0.846336 | −1.347746 | 0.723767 | −0.116919 |

In this numerical embodiment, the respective values of the above conditions (a-1), (a-2) and (a-3), the relative aperture diameter $F_{NO}$, and the focal length are listed in the table as below.

| | |
|---|---|
| $-f_1/f_2$ | 0.763 |
| $S_1 * F_{NO}/S_2$ | 0.243 |
| $R_2/R_3$ | 0.657 |
| $F_{NO}$ | 2.84 |
| Focal Length | 2.48 mm |

Figure 4:
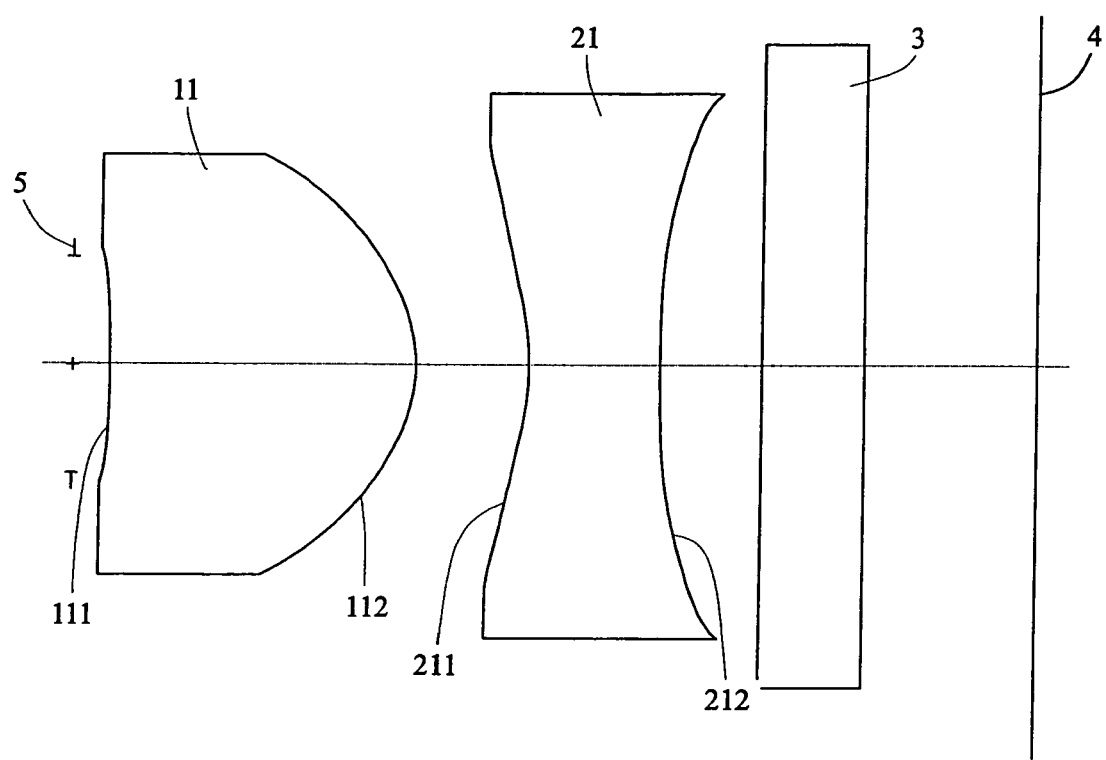
FIG. 4 is an optical cross-sectional view of a compact imaging lens system in accordance with Numerical Embodiment 2 of the present invention.
Figure 5A:
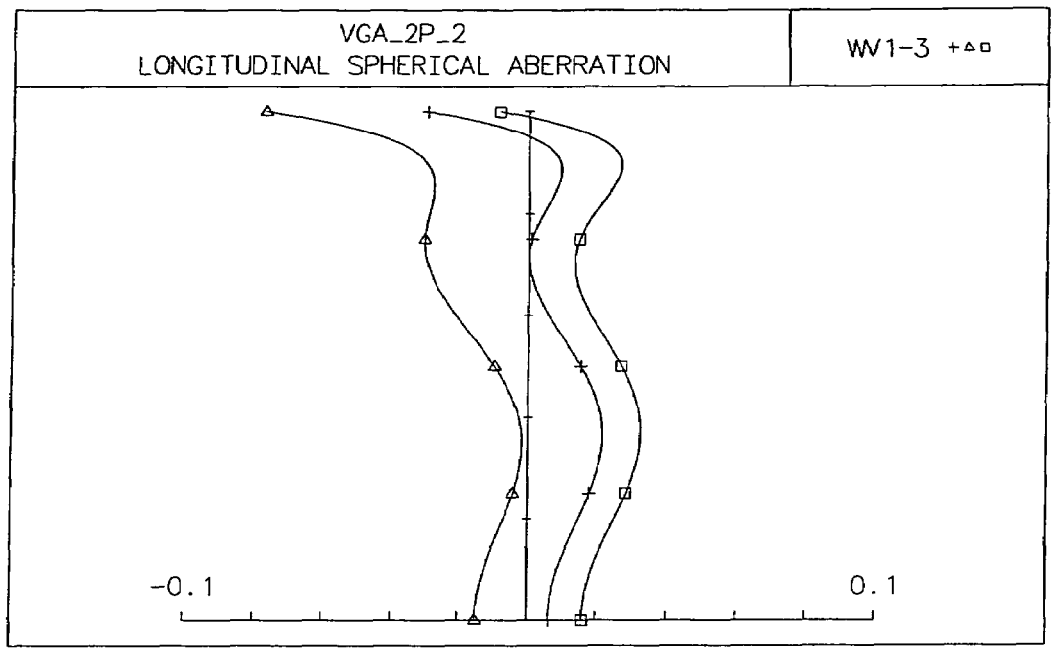
FIG. 5A shows a graph of longitudinal spherical aberration of Numerical Embodiment 2 of the present invention.
Figure 5B:
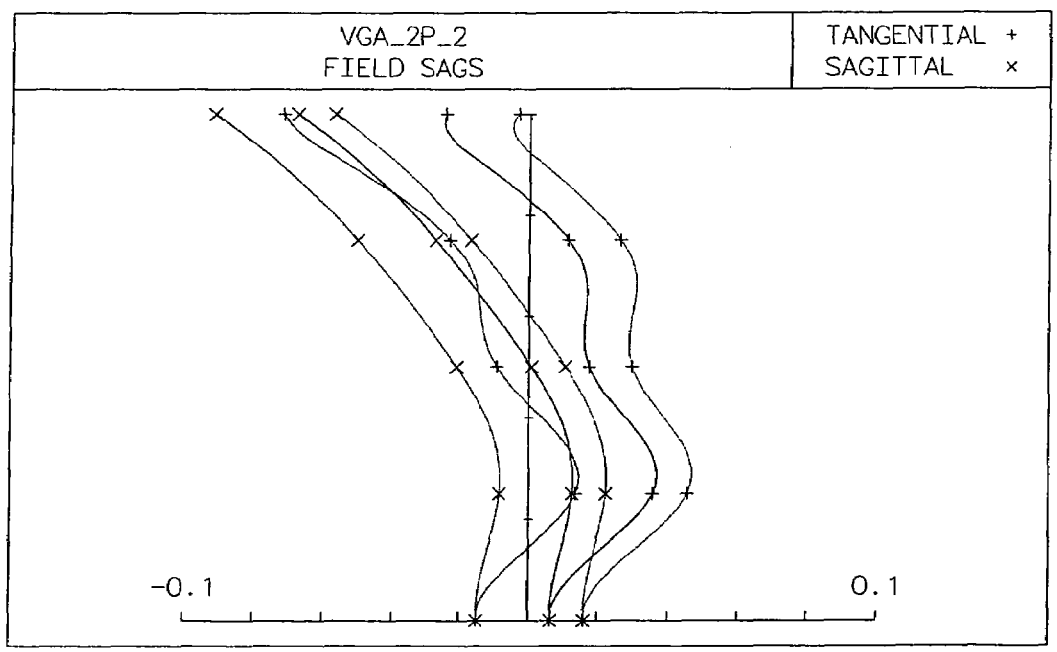
FIG. 5B shows a graph of field curvature of Numerical Embodiment 2 of the present invention.

FIG. 4 shows an optical cross-sectional view of a compact imaging lens system in accordance with Numerical Embodiment 2 of the present invention. Both first and second surfaces 111, 112 of the first lens element 11 in Numerical Embodiment 2 are aspheric. Also, both first and second surfaces 211, 212 of the second lens element 21 are made aspheric. The focal length of the compact imaging lens system of Numerical Embodiment 2 is 2.48 mm, and the relative aperture diameter is 2.84. The values of the above conditions (a-1), (a-2) and (a-3) are 0.763, 0.243 and 0.657, respectively. FIG. 5A shows a graph of longitudinal spherical aberration of Numerical Embodiment 2. FIG. 5B shows a graph of field curvature of Numerical Embodiment 2. From these graphs, it can be seen that the present compact imaging lens system of Numerical Embodiment 2 provides a high level of optical performance.

Numerical Embodiment 3

| Surface (i) | Ri (mm) | D (mm) | Nd | Vd | Conic |
|---|---|---|---|---|---|
| 1 (Aperture) | Infinite | 0.15 | | | |
| 2 | 23.397 | 1.3 | 1.5247 | 56.2 | 400.853 |
| 3 | −0.676 | 0.57 | | | −1.688762 |
| 4 | −0.798 | 0.55 | 1.5856 | 29.9 | −4.598373 |
| 5 | −38.72 | | | | −7652000 |

Asperic coefficients for the aspheric surfaces are illustrated below:

| | Coef. | | | | | | |
|---|---|---|---|---|---|---|---|
| Surface (i) | A | B | C | D | E | F | G |
| 2 | −0.330541 | 0.123653 | −3.767111 | 0 | 0 | 0 | 0 |
| 3 | −0.131097 | −0.121002 | −0.407860 | 0.973278 | −1.295302 | 0.935281 | −0.463023 |
| 4 | 0.190 | −0.763420 | 0.281843 | 1.225682 | −1.855663 | 0.910307 | −0.012933 |
| 5 | 0.495760 | −1.082616 | 1.369225 | −1.145195 | 0.664946 | −0.252242 | 0.047562 |

In this numerical embodiment, the respective values of the above conditions (a-1), (a-2) and (a-3), the relative aperture diameter $F_{NO}$, and the focal length are listed in the table as below.

| | |
|---|---|
| $-f_1/f_2$ | 0.913 |
| $S_1 * F_{NO}/S_2$ | 0.164 |
| $R_2/R_3$ | 0.847 |
| $F_{NO}$ | 3.0 |
| Focal Length | 2.51 mm |

Figure 6:
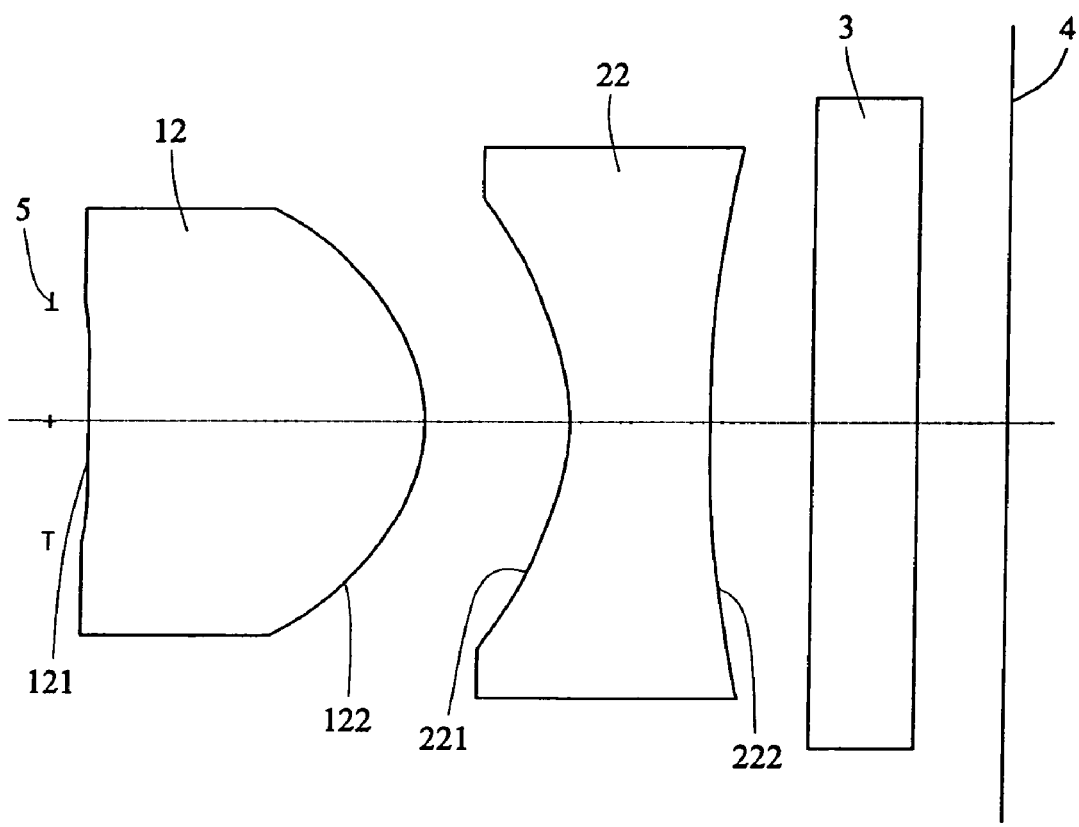
FIG. 6 is an optical cross-sectional view of a compact imaging lens system in accordance with Numerical Embodiment 3 of the present invention.
Figure 7A:
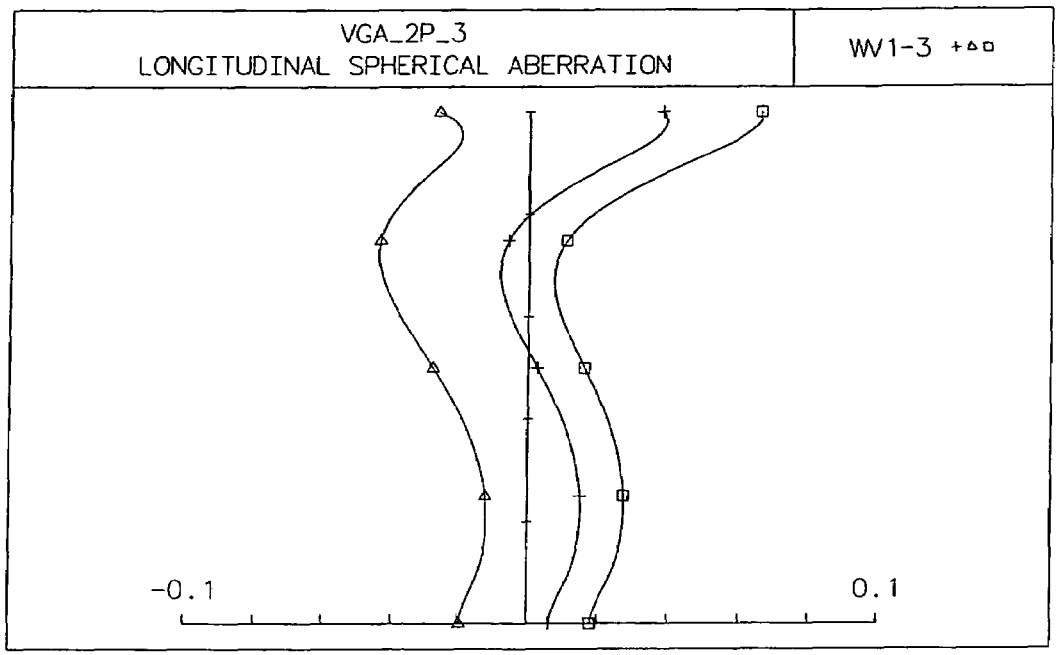
FIG. 7A shows a graph of longitudinal spherical aberration of Numerical Embodiment 3 of the present invention.
Figure 7B:
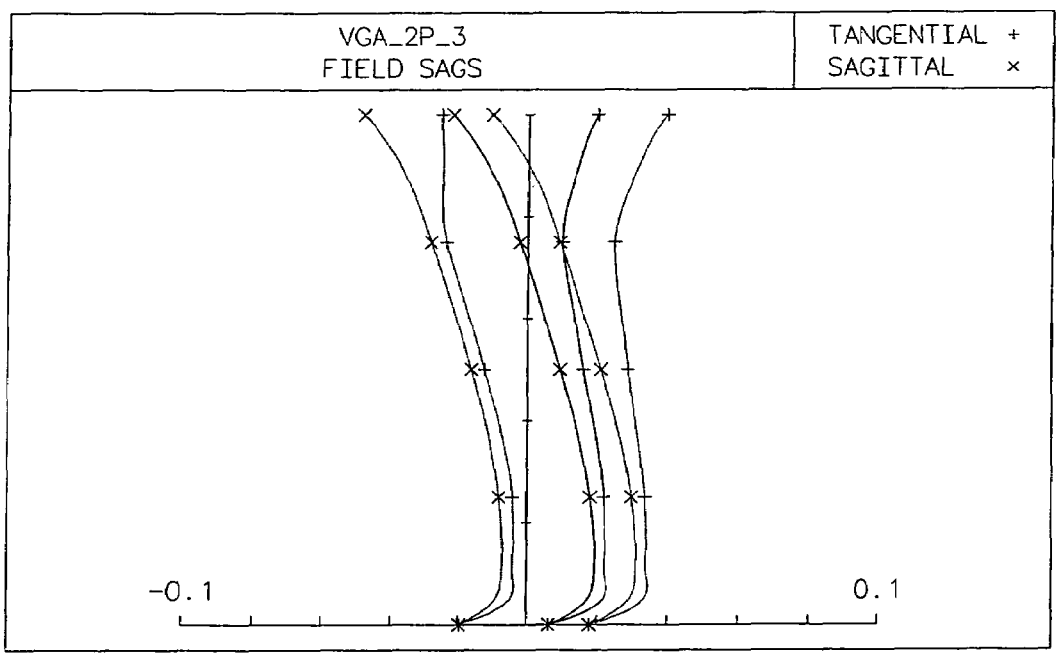
FIG. 7B shows a graph of field curvature of Numerical Embodiment 3 of the present invention.

FIG. 6 shows an optical cross-sectional view of a compact imaging lens system in accordance with Numerical Embodiment 3 of the present invention. Both first and second surfaces 121, 122 of the first lens element 12 in Numerical Embodiment 1 are aspheric. Also, both first and second surfaces 221, 222 of the second lens element 22 are made aspheric. The focal length of the compact imaging lens system of Numerical Embodiment 3 is 2.51 mm, and the relative aperture diameter is 3.0. The values of the above conditions (a-1), (a-2) and (a-3) are 0.913, 0.164 and 0.847, respectively. FIG. 7A shows a graph of longitudinal spherical aberration on of Numerical Embodiment 3. FIG. 7B shows a graph of field curvature of Numerical Embodiment 3. From these graphs, it can be seen that the present compact imaging lens system of Numerical Embodiment 3 provides a high level of optical performance.

The present compact imaging lens system adopts a positive and a negative aspheric lens elements 1, 2. The first lens element 1 is a meniscus lens convex toward the image side, whereby the incident light beam is diverged by the first surface 11 of the first lens element 1, and thus a wide area of the second surface 12 of the first lens element 1 can be illuminated by the divergent light beam. Consequently, aberrations can be more effectively corrected by the aspheric surfaces and tolerance sensitivity can be reduced. The second lens element 2 is a negative lens, and is provided mainly for correcting chromatic aberration and off-axis aberration. Besides aberration compensation, the aspheric design of both first and second lens elements 1, 2 also ensures significant reduction in overall length of the optical system. Further, the present imaging lens system consists of only two component lenses that are made of plastic (glass is also applicable when desired). This facilitates cost reduction, tolerance sensitivity reduction, easy assembly, and thus mass production.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A compact imaging lens system comprising a first lens element on the object side and a second lens element on the image side; the first lens element having a first concave surface facing the object side and an opposite second convex surface on the image side, at least one of the concave and convex surfaces being aspheric; the second lens element having a negative refractive power and including opposite first and second surfaces respectively on object and image sides, the first surface of the second lens element being aspheric; said compact imaging lens system having no more than two lens elements, the first and second lens elements satisfying the following conditional expression:

$$0.6 < -\frac{f_1}{f_2} < 1.2$$

where $f_1$ and $f_2$ respectively represent the focal lengths of the first and second lens elements; and the second surface of the first lens element and the first surface of the second lens element satisfying the following conditional expression:

$$0.45 < \frac{R_2}{R_3} < 0.95$$

where $R_2$ and $R_3$ respectively represent the curvature radii of the second surface of the first lens element and the first surface of the second lens element.

2. The compact imaging lens system as claimed in claim 1, wherein both the first and second surfaces of the first lens element are aspheric.

3. The compact imaging lens system as claimed in claim 2, wherein the first and second surfaces of the first lens element satisfy the following conditional expression:

$$0.1 < \frac{S_1}{S_2} \cdot F_{NO} < 0.3$$

where $S_1$ represents the sagitta of the first surface of the first lens element at the maximum diameter thereof, $S_2$ represents the sagitta of the second surface of the first lens element at the maximum diameter thereof, and $F_{NO}$ represents the relative aperture diameter.

4. The compact imaging lens system as claimed in claim 1, wherein the second surface of the second lens element is aspheric.

5. The compact imaging lens system as claimed in claim 4, wherein the aspheric surfaces of the first and second lens elements satisfy the following equation:

$$z = \frac{ch^2}{1 + [1-(k+1)c^2h^2]^{\frac{1}{2}}} + Ah^4 + Bh^6 + Ch^8 + Dh^{10} + Eh^{12} + Fh^{14} + Gh^{16}$$

where z is Sag value along the optical axis, c is the curvature (1/radius) of the surface, h is the semi-diameter height, k is the conic coefficient, and A, B, C, D, E, F and G are the 4th-order, 6th-order, 8th-order, 10th-order, 12th-order, 14th-order and 16th-order aspheric coefficients, respectively.

6. The compact imaging lens system as claimed in claim 1 further comprising an aperture disposed between the object and the first surface of the first lens element.

7. A compact imaging lens system comprising:
a first lens element on the object side, the first lens element having a concave surface facing the object side and an opposite convex surface on the image side, both the concave and convex surfaces being aspheric; and
a second lens element on the image side, the second lens element having opposite first and second surfaces respectively on the object and image sides, at least one of the first and second surfaces being aspheric;
wherein said compact imaging lens system has no more than two lens elements, the first and second lens elements have opposite refractive power and satisfy the following condition:

$$0.6 < -\frac{f_1}{f_2} < 1.2$$

where $f_1$ and $f_2$ respectively represent the focal lengths of the first and second lens elements, and the concave and convex surfaces of the first lens element satisfy the following conditional expression:

$$0.1 < \frac{S_1}{S_2} \cdot F_{NO} < 0.3$$

where $S_1$ represents the sagitta of the concave surface of the first lens element at the maximum diameter thereof, $S_2$ represents the sagitta of the convex surface of the first lens element at the maximum diameter thereof, and $F_{NO}$ represents the relative aperture diameter.

8. The compact imaging lens system as claimed in claim 7, wherein the first surface of the second lens elements is aspheric.

9. The compact imaging lens system as claimed in claim 8, wherein the convex surface of the first lens element and the first surface of the second lens element satisfy the following conditional expression:

$$0.45 < \frac{R_2}{R_3} < 0.95$$

where $R_2$ and $R_3$ respectively represent the curvature radii of the convex surface of the first lens element and the first surface of the second lens element.

10. The compact imaging lens system as claimed in claim 9, wherein the second surface of the second lens element is aspheric.

11. The compact imaging lens system as claimed in claim 10, further comprising an aperture disposed between the object and the concave surface of the first lens element.

12. The compact imaging lens system as claimed in claim 11, wherein the aspheric surfaces of the first and second lens elements satisfy the following equation:

$$z = \frac{ch^2}{1 + [1-(k+1)c^2h^2]^{\frac{1}{2}}} + Ah^4 + Bh^6 + Ch^8 + Dh^{10} + Eh^{12} + Fh^{14} + Gh^{16}$$

where z is Sag value along the optical axis, c is the curvature (1/radius) of the surface, h is the semi-diameter height, k is the conic coefficient, and A, B, C, D, E, F and G are the 4th-order, 6th-order, 8th-order, 10th-order, 12th-order, 14th-order and 16th-order aspheric coefficients, respectively.

* * * * *